(12) United States Patent
Jarma

(10) Patent No.: US 8,746,711 B1
(45) Date of Patent: Jun. 10, 2014

(54) DISC GOLF TRANSPORT APPARATUS

(76) Inventor: Barry Michael Jarma, Cameron, TX (US)

(*) Notice: Subject to any disclaimer, the term of this patent is extended or adjusted under 35 U.S.C. 154(b) by 73 days.

(21) Appl. No.: 13/554,064

(22) Filed: Jul. 20, 2012

(51) Int. Cl.
*B62B 1/00* (2006.01)
*B62B 7/02* (2006.01)

(52) U.S. Cl.
USPC ............. 280/47.33; 280/47.131; 280/47.17

(58) Field of Classification Search
CPC .... A63B 55/08; A63F 9/02; B62B 2202/404; B62B 2202/406; B62B 2205/00; B62B 2205/04; B62B 2205/003; B62B 1/00; B62B 1/008; B62B 1/12; B62B 1/18; B62B 1/26; B62B 1/14; B62B 1/16; B62B 3/00; B62B 3/02; B62B 3/04; B62B 3/08; B62B 3/10
USPC ......... 280/29, 37, 47.19, 47.35, 47.26, 47.38, 280/62, 642, 645, 647, 650, 651, 657, 280/47.17, 652; 211/193, 150, 169, 90.02; 108/42

See application file for complete search history.

(56) References Cited

U.S. PATENT DOCUMENTS

| 2,711,027 | A | * | 6/1955 | Williamson | 280/40 |
| 4,550,930 | A | * | 11/1985 | Proffit | 280/655 |
| 4,889,267 | A | * | 12/1989 | Bolton | 224/274 |
| 5,439,241 | A | * | 8/1995 | Nelson | 280/645 |
| 5,752,634 | A | * | 5/1998 | Kortman | 224/274 |
| 5,836,601 | A | * | 11/1998 | Nelson | 280/645 |
| D409,812 | S | * | 5/1999 | Lindblom et al. | D34/24 |
| 7,101,293 | B2 | * | 9/2006 | Tarng et al. | 473/446 |
| 7,874,563 | B2 | | 1/2011 | Mims | |
| 7,901,018 | B2 | * | 3/2011 | Baughman | 312/240 |
| 7,997,594 | B1 | * | 8/2011 | Mortazavi et al. | 280/47.26 |
| 7,997,595 | B1 | | 8/2011 | Pope | |
| 8,517,411 | B2 | * | 8/2013 | Martin | 280/646 |
| 2002/0105156 | A1 | | 8/2002 | Glidden | |
| 2008/0093813 | A1 | * | 4/2008 | Kemp et al. | 280/47.35 |

* cited by examiner

*Primary Examiner* — J. Allen Shriver, II
*Assistant Examiner* — James M Dolak
(74) *Attorney, Agent, or Firm* — Egbert Law Offices, PLLC

(57) ABSTRACT

A disc golf transport apparatus has a frame with an upper and a lower end, a disc container affixed to the frame between the upper and the lower end, at least one wheel rotatably mounted adjacent the lower and of the frame, and at least one leg pivotally mounted adjacent the upper end of the frame so as to be movable between an extended position and a retracted position. A rack is affixed adjacent the lower end of the frame so as to extend forwardly of the wheel. A box is affixed adjacent the upper end of the frame so as to extend generally horizontally outwardly therefrom.

18 Claims, 5 Drawing Sheets

DISC GOLF TRANSPORT APPARATUS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the play of disc golf. More particularly, the present invention the relates to apparatus for transport of disc golf articles during play. Additionally, the present invention relates to disc golf transport apparatus which include a seat and a cooler positioned thereon.

2. Description of Related Art

Including Information Disclosed Under 37 CFR 1.97 and 37 CFR 1.98.

Disc golf is a disc game in which individual players throw a flying disc into a basket or at a target. According to the Professional Disc Golf Association, "The object of the game is to traverse a course from beginning to end in the fewest number of throws of the disc." Three basic components go into a course design: disc pole holes, tee signs and tee pads. A disc pole hole comprises a center pole, a chain holder and a basket. A set of chains hang down from the chain holder surrounding the center pole. Surrounding the pole below the chains is a circular basket that serves to catch a disc thrown at the chains of the disc pole hole. The disc pole hole is commonly known as a basket or a catcher. When the disc drops into the basket, the player moves to the next tee.

For each hole, a tee pad provides a firm and level foundation to start play from or to tee off. Some courses have alternative tee pads for a given hole. Similar to traditional golf, one tee is often closer to the target, allowing multiple players of different skill levels a better chance of competitive play.

Analogous to the various types of clubs in traditional golf, there are different types of discs in disc golf that are used in different playing situations. The basic types of discs include putters, mid-range discs, and drivers. Putters are designed to fly straight, predictably, and more slowly compared to mid-range discs and drivers. Mid-range discs have slightly sharper edges, which enable them to cut through the air better. Drivers have the sharpest edge and have most of their mass concentrated on the outer rim of the disc rather than distributed equally throughout.

Drivers are often further divided into different categories. For example, one manufacturer provides distance drivers and fairway drivers, with a fairway driver being somewhere between a distance driver and a mid-range disc. Other driver categories include long drivers, extra-long drivers and maximum distance drivers.

Players, especially experienced players, may carry a dozen or more discs with them, together with accessories such as disc bags, water or other beverages, sunscreen, towels, jackets, umbrellas, folding chairs and so forth. The discs are typically carried in a duffel bag or something similar. Carriers are specifically adapted for carrying discs and some accessories.

Unfortunately, the problem with the use of such of duffle bags and backpacks is that they can become tiresome over the course of play. Many disc golf players become fatigued during the course of the play. Additionally, the various disc golf items can become jumbled within the bag and become difficult to access. Furthermore, whenever duffle bags are used, the player must bend over in order to reach the duffle bag and to rummage through the duffle bag in order to secure the proper item.

During the course of play, many disc golf players choose to bring a folding chair. The folding chair is often deployed during interruptions in play. As such, the player can sit comfortably while awaiting his or her turn. Unfortunately, these folding chairs are often very cumbersome to handle and to transport.

During the course of play, disc golf players often desire to have a refreshing beverage. As such, at least one of the disc golf players in a group will need to carry a cooler. The cooler can carry the various refreshments therein. Of course, the weight of the cooler becomes very cumbersome to the disc golf players and can further create fatigue on behalf of he players. As such, a need has developed so as to provide a disc golf transport apparatus which can conveniently carry all of the disc golf items, provide such items at a convenient location, and can also provide storage and transport of a seat and a cooler.

In the past, various patents have issued relating to disc golf transport articles. For example, U.S. Pat. No. 7,874,563, issued on Jan. 25, 2011 to Mims, shows a disc golf equipment cart that has a chassis, at least three wheels rotatably coupled to the chassis, a handle member mounted to the chassis, a floor platform mounted on the chassis, and at least one seat member retractably mounted on the floor platform such that the seat member descends through the floor platform with the application of a sufficient weight. The seat member can includes a seat mounted on a support. When someone sits on the seat, the seat support descends through a hole in floor platform until it hits the ground. The ground then supports the weight of the sitter. When the sitter stands up and gets off the seat, the seat member ascends through the floor platform back to its starting position, or close thereto.

U.S. Pat. No. 7,997,595, issued on Aug. 16, 2011 to Pope, describes a wheeled and collapsible disc golf caddy system. The system includes an elongated frame member having a handle at one end thereof for towing the system behind the user. Intermediate the frame member is a pair of collapsible wheels. The remote end of the frame member mounts a pivotal rim for removably receiving a drink-containing chest that can be removably secured to the frame member. Additionally, the system includes a housing that is mounted to the frame member and contains several shelves for storing a variety of discs.

U.S. Patent Publication No. 2002/0105156, published on Aug. 8, 2002 to K. L. Glidden, provides a disc golf bagcart. This disc golf bagcart has a frame, a handle, wheels and a disc compartment. The handle extends generally upward from the frame when the frame is in an upright standing position. The wheels are operatively connected to the frame. The disc compartment is integrally formed within the frame and is adapted to removably receive a preselected assortment of disc golf golfing discs. The disc compartment extends along the frame length. The discs can be stacked along the frame length with the discs being oriented generally perpendicular to the frame length.

It is an object of the present invention to provide a disc golf transport apparatus that allows for the storage of a large number of discs.

It is an object of the present invention to provide a disc golf transport apparatus which can be convertible between a dolly and a seat.

It is another object of the present invention to provide a disc golf transport system which is lightweight.

It is still a further object of the present invention to provide disc golf transport system which carries all items associated with the game of disc golf.

It is a further object of the present invention to provide a disc golf transport system which is able to be pulled from the side.

It is a further object of the present invention to provide disc golf transport system that maintains the disc putter at waist level.

It is a still another object of the present invention to provide disc golf transport apparatus which supports the disc at knee level.

It is a further object of the present invention to provide disc golf transport apparatus which allows the golfer to access all items without having to bend more than 30°.

It is a further object of the present invention to provide disc golf transport apparatus that allows for the carrying of a cooler.

It is still a further object of the present invention to provide disc golf transport apparatus which avoids the need of physically carry all of the disc golf equipment.

These and other objects and advantages of the present invention will become apparent from a reading of the attached specification and appended claims.

BRIEF SUMMARY OF THE INVENTION

The present invention is a disc golf transport apparatus that comprises a frame having an upper end and a lower end, a disc container affixed to the frame between the upper end and the lower end, at least one wheel rotatably mounted adjacent the lower and of the frame, and at least one leg pivotally mounted adjacent the upper end of the frame. The leg is movable between an extended position and a retracted position.

A rack is affixed adjacent the lower end of the frame so as to extend forwardly of the wheel. The rack is movable between a deployed position and a stowed position. The rack has a horizontal orientation when in the deployed position. The rack is position against the frame in the stowed position.

A box is affixed adjacent the upper end of the frame so as to extending generally horizontally outwardly therefrom. A seat is pivotally connected to the box so as to be movable between a first position covering the box and a second position exposing the interior of the box.

A lever is pivotally connected adjacent the upper end of the frame. The lever is cooperative with the leg so as to lock the leg in the retracted position. The lever defines a handle extending outwardly of the upper end of the frame when the leg is in the retracted position. The leg includes a first leg pivotally affixed at one end adjacent the upper end of the frame, a second leg pivotally affixed at one end adjacent the upper end of the frame, and a cross bar affixed to opposite ends of the first and second legs. The lever has gear teeth formed adjacent the pivotal connection with the upper end of the frame. The leg has complementary gear teeth engaged with the gear teeth of the lever when the leg is in the retracted position.

The disc container has a plurality of disc dividers affixed in an interior of the disc container. The plurality of disc dividers are suitable for receiving discs therebetween. The disc container includes a first flap hingedly affixed to one side of the disc container and a second flap hingedly affixed to an opposite side of the disc container. The first and second flaps are movable between a position covering the disc container and another position exposing an interior of the disc container.

The wheel includes a first wheel positioned outwardly of one side of the frame, and a second wheel positioned outwardly of an opposite side of the frame. An odometer is rotatably mounted to the frame so as to have a surface bearing on the wheel so as to allow for distance measurements. A cooler can be removably positioned on an upper surface of the rack. The rack has a grill extending upwardly therefrom at an end the rack opposite the frame.

The foregoing section is intended to describe, in generality, the preferred embodiment of the present invention. It is understood that variations in the preferred embodiment can be made within the scope of the present invention. This section is not intended, in any way, to be limiting of the scope of the present invention. The present invention should only be limited by the following claims and their legal equivalents.

DETAILED DESCRIPTION OF THE INVENTION

Figure 1:
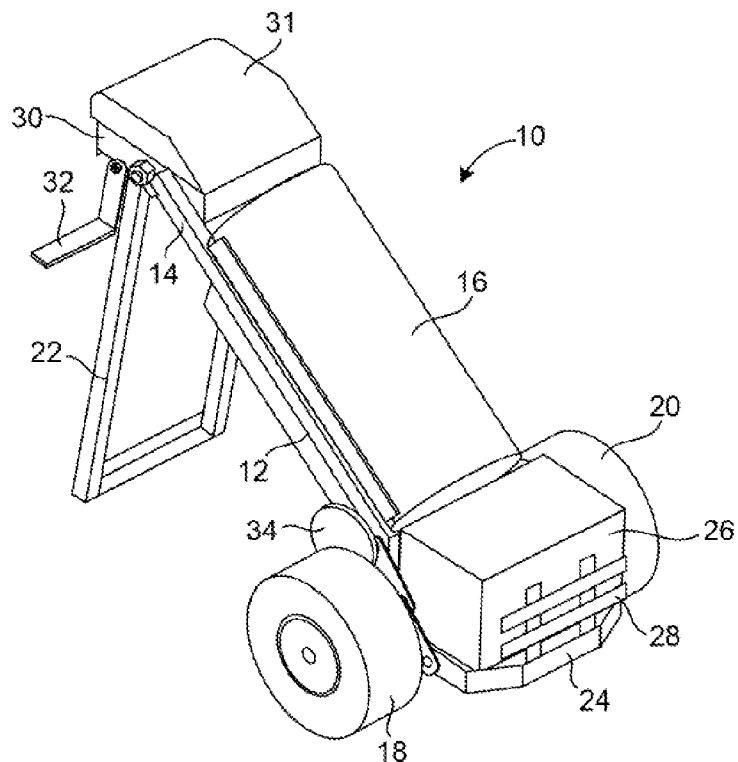
FIG. 1 is an upper perspective view showing the disc golf transport apparatus in accordance with the preferred embodiment of the present invention.

Referring to FIG. 1, there is shown the disc golf transport apparatus 10 in accordance with the preferred embodiment of the present invention. The disc golf transport apparatus 10 has a frame 12 having an upper end 14 and lower end. A disc container 16 is mounted on the frame 12 and positioned between the upper end 14 and the lower end of the frame 12. Wheels 18 and 20 are rotatably mounted to the frame 12 adjacent the lower end thereof. Wheels 18 and 20 extend outwardly on opposite sides of the frame 12. A leg 22 is pivotally mounted to the upper end 14 of the frame 12. The leg 22 is illustrated in its extended position. As such, the leg 22 is suitable for supporting the frame 12 in angularly upward position.

A rack 24 is affixed adjacent to the lower end of the frame 12 so as to extend forwardly of the wheels 18 and 20. The rack 24 is illustrated in a deployed position so as to have a generally horizontal orientation. A cooler 26 is positioned on the top surface of the rack 24. The rack 24 also includes a grill 28 that is positioned at the end of the rack 24 opposite the frame 12. The grill 28 serves to retain the cooler 26 on the top surface of the rack 24.

A box 30 is affixed adjacent to the upper end 14 of the frame 12. A seat 31 is illustrated in a position covering the open top end of the box 30. The box has an interior volume suitable for receiving a putter therein, along with other items of disc golf equipment. The leg 22 is illustrated as extending downwardly below the bottom of the box 30.

A lever 32 is illustrated as extending outwardly of the upper end 14 of the frame 12. Lever 32 has a generally L-shaped configuration. A portion of the lever 32 extends in a horizontal orientation outwardly of a side of the frame 12. As such, the lever 32 provides a surface that can be easily grasped by the user. As such, the disc golf transport apparatus 10 can be moved along an underlying surface at the side of the user. As will be described hereinafter, the lever 32 is pivotally connected adjacent to the upper end 14 of the frame 12 and is cooperative with the leg 22 so as to allow the leg to be fixed in a retracted position and affixed in an extended position (as shown in FIG. 1).

An odometer 34 is rotatably mounted to the side of the frame 12. Odometer 34 provides a distance measurement to the user. The odometer 34 is illustrated as bearing upon a surface of the wheel 18. As such, as the wheel 18 rotates, the odometer 34 will also rotate so as to provide the distance measurement. As such, the disc golf transport apparatus 10 of the present invention can be effectively used so as to measure the distance of throws of the discs or measure distances associated with an intended target.

Figure 2:
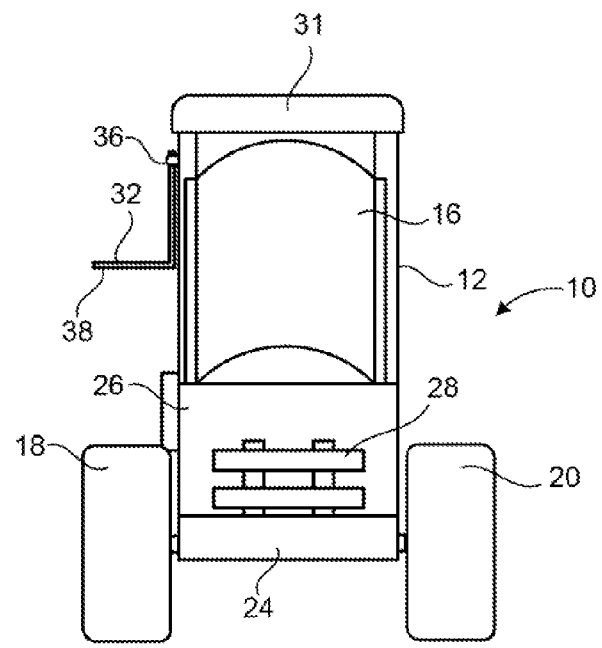
FIG. 2 is a frontal view of the disc golf transport apparatus of the preferred embodiment of the present invention.

FIG. 2 is forward view of the disc golf transport apparatus 10 of the present invention. In particular, it can be seen that the rack 24 has a generally horizontal orientation and will extend between the wheels 18 and 20. The wheels 18 and 20 have a ground-engaging surface which is positioned below the bottom of the rack 24. The grill 28 extends upwardly from the rack 24. Grill 28 is illustrated as having a pair of horizontal bars and a pair of vertical bars. However, within the concept of the present invention, the rack 24 can have a variety of configurations. The grill 28 is intended to provide a surface against which the cooler 26 can reside. As such, the cooler 26 can be retained in a proper position forward of the wheels 18 and 20 so as to allow for a proper balancing of the disc golf transport apparatus 10.

The frame 12 extends upwardly from the rack 24. The disc container 16 is mounted between the sides of the frame 12 so as to be in a convenient location for the user. Since the disc are stored within the disc container 16, when the flaps (to be described hereinafter) are opened, the various discs will be in a convenient location and in an organized fashion for access by the user. The user will not to bend more that 30° in order to access the discs within the disc container 16. The seat 31 is illustrated as located above the disc container 16 at the top of the frame 12. A towel hook 36 extends outwardly of the side of the frame 12 in a location generally adjacent to the seat 31. The towel hook 36 can be utilized so as to allow the disc golfer to affix a towel thereto.

The lever 32 has a horizontal portion 38 that extends outwardly of the side of the frame 12. As such, the user can easily grasp this horizontal portion 38 of the lever 32 so as to allow convenient movement of the disc golf transport apparatus 10.

Figure 3:
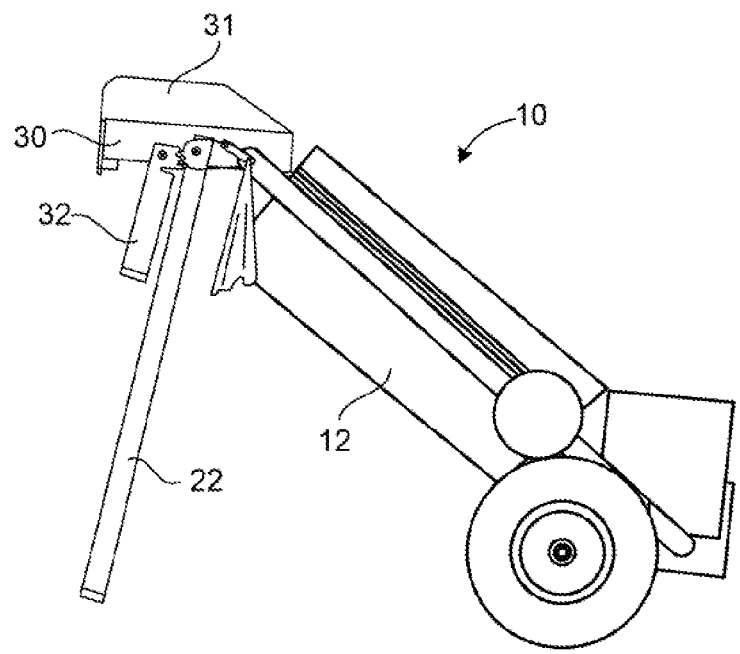
FIG. 3 is a side elevational view showing the disc golf transport apparatus of the preferred embodiment of the present invention.

FIG. 3 shows a side view of the disc golf transport apparatus 10 of the present invention. As can be seen, the leg 22 extends downwardly and outwardly at an acute angle relative to the frame 12. The box 30 is located above the leg 22. The seat 31 is positioned directly above the top of the box 20. Since the leg 22 is fixed in a proper position directly below the seat 31, the leg 22 can provide a strong support for the seat 31. As such, the use of the disc golf transport apparatus 10 will have a convenient location upon which to sit. The lever 32 extends downwardly from the box 30 and is located in a position generally adjacent to a surface of the leg 22. It can be seen that the lever 32 is pivotally connected to the side of the box 30. The lever 32 can move between the lowered position (as illustrated in FIG. 3) adjacent to the leg 32 to an upward position when the leg 32 is retracted against the frame 12.

Figure 4:
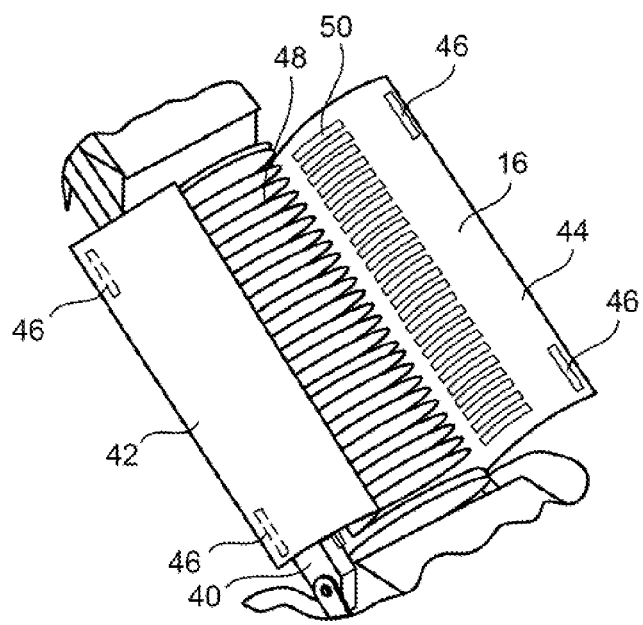
FIG. 4 is detailed view, in perspective, of the disc container as used in the disc golf transport apparatus of the present invention.

FIG. 4 is an interior view showing the disc container 16 of the present invention. The disc container 16 includes a container 40. A first flap 42 is hingedly affixed on side of the container 40. A second flap 44 is hingedly connected to an opposite side of the container 40. Each of the flaps 42 and 44 includes hook-and-loop fasteners 46. The hook-and-loop fasteners 46 can be joined together so as to close the flaps 42 and 44 upon one another so as to enclose the discs 48 within the interior of the container 40. The discs 48 are arranged in spaced relationship to each other. Suitable disc dividers 50 can be provided along the inner surface of the flaps 42 and 44 so as to retain the discs 48 in a properly organized and arranged configuration. In the preferred embodiment of the present invention, at total of twenty-four discs can be retained within the container 40. Within the concept of the present invention, the flaps 42 and 44 can be of a fabric material, a polymeric material, or a rigid metallic material.

Figure 5:
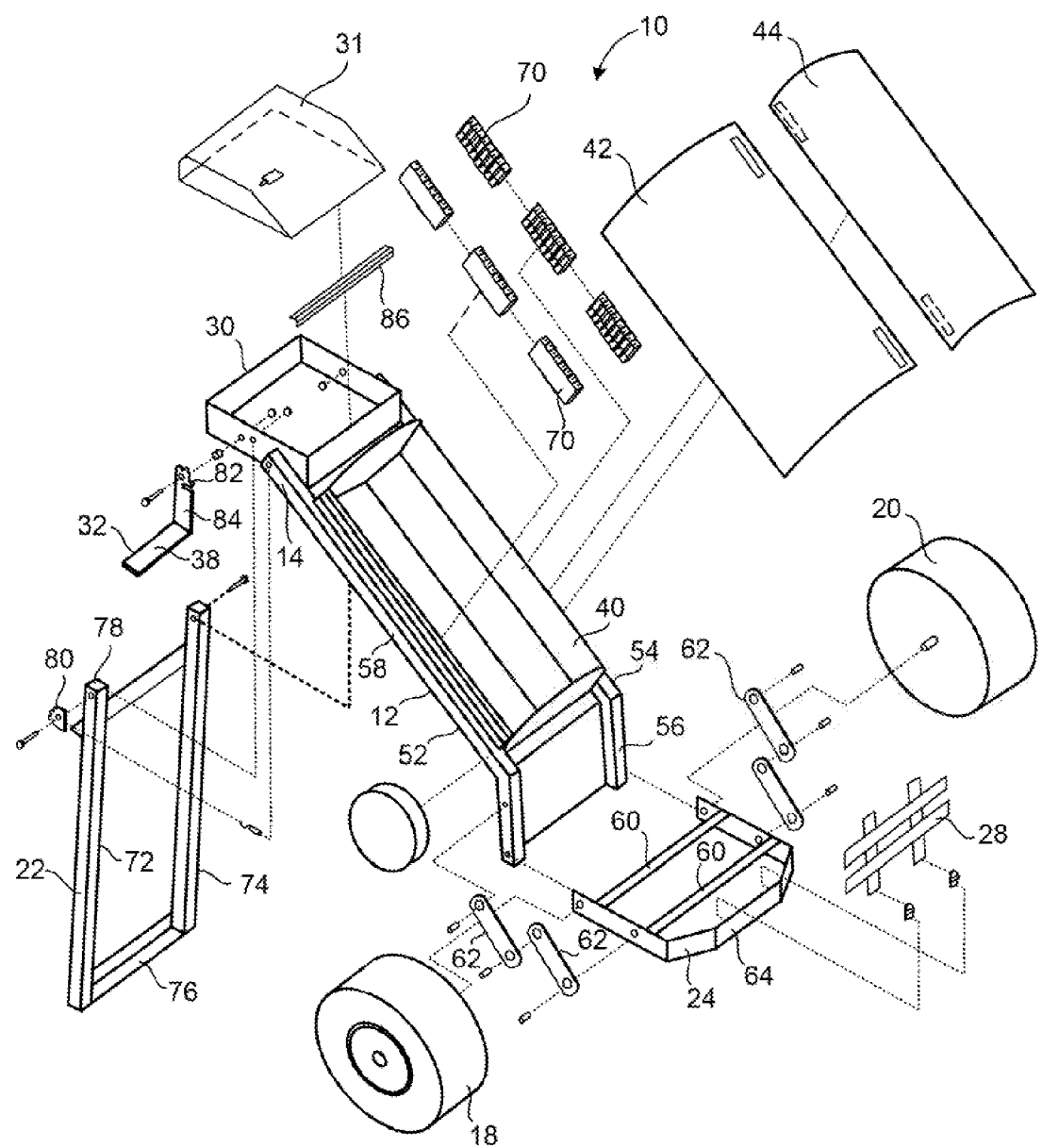
FIG. 5 is an exploded view of the disc golf transport apparatus of the present invention.

FIG. 5 is an exploded view of the disc golf transport apparatus 10 of the present invention. The disc golf transport apparatus 10 includes the frame 12 having a first side 52 and a second side 54. The frame 12 has an upper end 14 and a lower end 56. The frame 12 has the lower end 56 extending generally vertically relative to the inclined central portion 58.

The rack 24 is pivotally connected to the lower end 56 of the frame 12. The rack 24 includes cross bars 60 extending thereacross. Cross bars 60 provide the support of the cooler upon the top surface of the rack 24. Hinge plates 62 will extend the sides of the rack 24 to the lower end 56 of the frame 12. As such, the hinge plates 62 will provide a strong structural support for the rack 24 when the rack 24 is in its deployed position extending generally horizontal outwardly of the lower end 56 of the frame 12. The rack 28 is illustrate as affixed to the forward end 64 of the rack 24 through the use of suitable fasteners.

Wheels 18 and 20 each have axles that are rotatably mounted generally adjacent to the lower end 56 of the frame 12. As such, the wheels 18 and 20 can roll smoothly upon an underlying surface. As can be seen, the rack 24 is located forward of the wheels 18 and 20 so as to provide a balancing effect to the disc golf transport apparatus 10 of the present invention.

The container 40 of the disc container 16 is fixedly mounted to the sides 52 and 54 of the frame 12. The container 40 has a suitable volume in an interior thereof for retaining the discs therein. Disc dividers 70 can be affixed to the respective sides of the container 40 so as to provide an area into the which the discs can be placed in an organized fashion. The first flap 42 has a lower edge that is hingedly mounted to one side of the container 40. The flap 44 also has a lower edge that is hingedly affixed to the opposite side of the container 40.

The leg 22 is made up of a first leg 72, a second leg 74 in parallel relationship to the first leg 72, and a cross bar 76 located at the bottom end of each of the first leg 72 and the second leg 74. As such, leg 22 will have a generally U-shaped configuration. The upper end 78 of the leg 22 will be pivotally mounted to the sides of the box 30. A toothed gear 80 is affixed to the upper end 78 of the leg 22. Toothed gear 80 will receive the complementary toothed gear 82 associated with the lever 32 so as to maintain the leg 22 in either the extended position or the retracted position.

The lever 32 is illustrated as having a generally L-shaped configuration. The portion 38 of the lever 32 extends in a general horizontal orientation. Another portion 84 of lever 32 will be pivotally connected to the side of the box 30.

The box 30 is illustrated as having an open upper end. The box 30 includes a seat hinge 86 and will be mounted along the forward edge at the top of the box 30. Seat 31 will connected to the hinge 86 so as to be pivotally mounted to the box 30. The interior volume of the box 30 can receive the disc putter therein, along with other items, such as a score card or markers.

Figure 6:
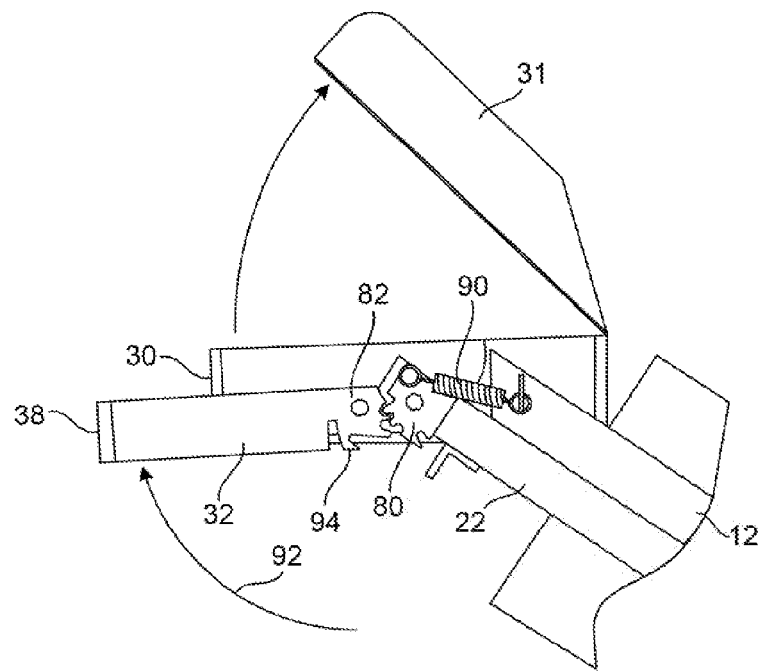
FIG. 6 is a detailed view of the disc golf transport apparatus of the present invention showing the seat in a position exposing the interior of the putter-containing box.

FIG. 6 illustrates the operation of the lever 32 for the positioning of the legs 22. The leg 22 has toothed gear 80 affixed at the upper end thereof. Similarly, the lever 32 will have a complementary toothed gear 82. When the leg 22 is moved to the retracted position (as shown in FIG. 6), the teeth of the gear will engage the teeth of the gear 80 so as to fix the leg 22 in this position. A spring 90 will extend between the frame 12 and the toothed gear 80 of the leg 22 so as to resiliently urge the leg 22 away from the lever 32. When the teeth of the respective gears 80 and 82 are engaged, the leg 22 will be locked into position. The lever 32 is illustrated as rotated upwardly (as shown by arrow 92). As such, the horizontal portion 38 of the lever 32 will extend outwardly of the box 30. This horizontal portion 38 will be in a convenient location whereby the user can conveniently move the disc golf transport apparatus 10.

The toothed gear 82 includes a latching member 94 thereon. The latching member 94 will engage a complementary latch on the gear 80 so as to lock the leg 22 in the extended position. In this orientation, the lever 32 is moved downwardly (opposite to that of arrow 92) so that the latches can engage each other.

FIG. 6 further shows that the seat 31 is pivoted upwardly about hinge 86. When the seat 31 pivots upwardly, the interior of the box 30 will be exposed. As such, the user has easy access to the interior of the box 30.

Figure 7:
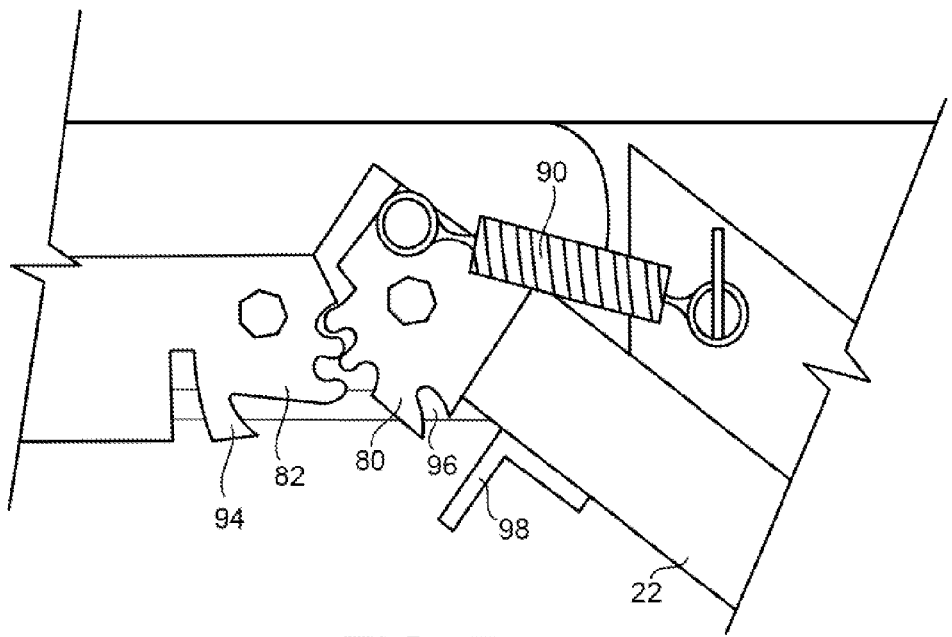
FIG. 7 is a detailed view of the leg lever as used in the disc golf transport apparatus of the present invention.

FIG. 7 is a detailed showing of the relationship between the toothed gear 80 and the complementary gear 82. As can be seen, when the leg 22 is in the retracted position, the teeth of the respective gears 80 and 82 are engaged with each other. The spring 90 will maintain this orientation. When the leg 22 is moved downwardly back to the extended position, the latch 94 will engage with the slot 96 so as to fix the leg 22 in the extended position. An angle iron 98 is affixed to the surface of the leg 22 so as to bear against the underside of the box 30 so as to further fix the leg 22 in a sturdy extended position.

Figure 8:
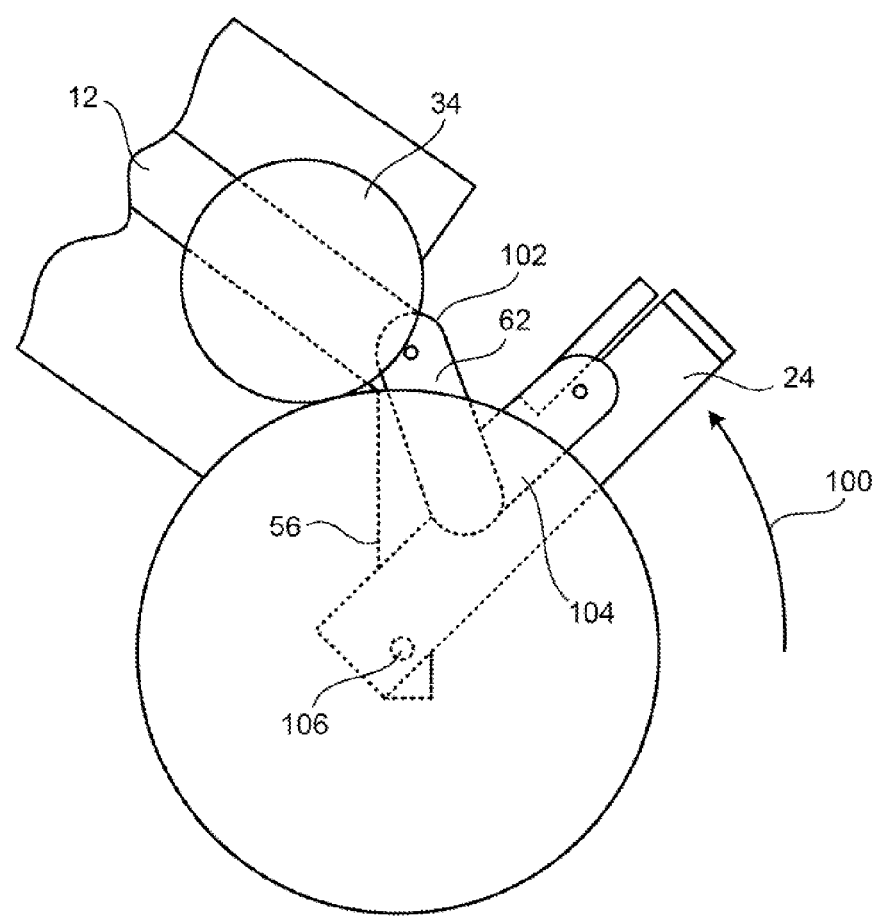
FIG. 8 is a detailed view showing the movement of the cooler rack of the disc golf transport apparatus of the present invention.

FIG. 8 shows the manner in which the rack 24 can be moved from a horizontal orientation to a stowed position. Arrow 100 illustrates the movement of the rack 24. As can be seen, the hinge plate 62 has a first portion 102 and a second portion 104 which have a scissor-like action. As such, as the rack 24 is moved upwardly, portions 102 and 104 will scissor toward each other while the rack 24 pivots about pivot point 106 located at the lower end 56 of the frame 12.

FIG. 8 further shows how the odometer 34 bears against a surface of the wheel 18 so as to provide a display of distance in relation to the wheel 18.

The foregoing disclosure and description of the invention is illustrative and explanatory thereof. Various changes in the details of the described construction can be made within the scope of the appended claims without departing from the true spirit of the invention. The present invention should only be limited by the following claims and their legal equivalents.

I claim:

1. A disc golf transport apparatus comprising:
   a frame having an upper and a lower end;
   a disc container affixed to said frame between said upper and said lower end;
   at least one wheel rotatably mounted adjacent said lower end of said frame;
   at least one leg pivotally mounted adjacent said upper end of said frame, the leg being movable between an extended position and a retracted position; and
   a lever pivotally connected adjacent said upper end of said frame, said lever being cooperative with the leg so as to lock said leg in said retracted position.

2. The disc golf transport apparatus of claim 1, further comprising:
   a rack affixed adjacent said lower end of said frame so as to extend forwardly of the wheel.

3. The disc golf transport apparatus of claim 2, said rack being movable between a deployed position and a stowed position, said rack having a horizontal orientation when in said deployed position, said rack being positioned against said frame in said stowed position.

4. The disc golf transport apparatus of claim 1, further comprising:
   a box affixed adjacent said upper end of said frame so as to extend generally horizontally outwardly therefrom.

5. The disc golf transport apparatus of claim 4, further comprising:
   a seat pivotally connected to said box so as to be movable between a first position covering said box and a second position exposing an interior of said box.

6. The disc golf transport apparatus of claim 1, said lever defining a handle extending horizontally outwardly of said upper end of said frame when the leg is in the retracted position.

7. The disc golf transport apparatus of claim 1, the leg comprising:
   a first leg pivotally affixed at one end adjacent said upper end of said frame;
   a second leg pivotally affixed at one end adjacent said upper end of said frame; and
   a cross bar affixed to opposite ends of said first and second legs.

8. The disc golf transport apparatus of claim 1, said lever having gear teeth formed adjacent the pivotal connection with said upper end of said frame, said leg having complementary gear teeth engaged with said gear teeth of said lever when the leg is in the retracted position.

9. The disc golf transport apparatus of claim 1, said disc container having a plurality of disc dividers affixed in an interior of said disc container, said plurality of disc dividers suitable for receiving discs therebetween.

10. The disc golf transport apparatus of claim 1, said disc container having a first flap hingedly affixed to one side of said disc container and a second flap hingedly affixed to an opposite side of said disc container, said first and second flaps movable between a position covering said disc container and a second position exposing an interior of said disc container.

11. The disc golf transport apparatus of claim 1, said at least one wheel comprising:
   a first wheel positioned outwardly of one of said frame; and
   a second wheel positioned outwardly of an opposite side of said frame.

12. The disc golf transport apparatus of claim 1, further comprising:
   an odometer rotatably mounted to said frame so as to have a surface bearing on the wheel so as to provide a distance measurement.

13. The disc golf transport apparatus of claim 2, further comprising:

a cooler removably positioned on an upper surface of said rack.

14. The disc golf transport apparatus of claim 2, said rack having a grill extending upwardly therefrom at an end of said rack opposite said frame.

15. A disc golf transport apparatus comprising:
a frame having an upper end and a lower end;
a disc container affixed to said frame between said upper and said lower end;
at least one wheel rotatably mounted adjacent said lower end of said frame; and
a rack affixed adjacent said lower end of said frame so as to extend forwardly of the wheel; and
a lever pivotally connected adjacent said upper end of said frame, and lever being cooperative with the leg so as to lock said leg in said retracted position, said lever defining a handle extending outwardly of said upper end of said frame when the leg is in the retracted position.

16. The disc golf transport apparatus of claim 15, further comprising:
at least one leg pivotally mounted adjacent said upper end of said frame, the leg being movable between an extended position and a retracted position.

17. The disc golf transport apparatus of claim 15, further comprising:
a box affixed adjacent said upper end of said frame so as to extend generally horizontally outwardly therefrom;
a seat pivotally connected to said box so as to be movable between a first position covering said box and a second position exposing an interior of said box.

18. The disc golf transport apparatus of claim 15, further comprising:
a cooler removably positioned on an upper surface of said rack.

* * * * *